No. 648,391. Patented May 1, 1900.
N. COLEMAN.
VEHICLE WHEEL.
(Application filed Oct. 10, 1899.)
(No Model.)
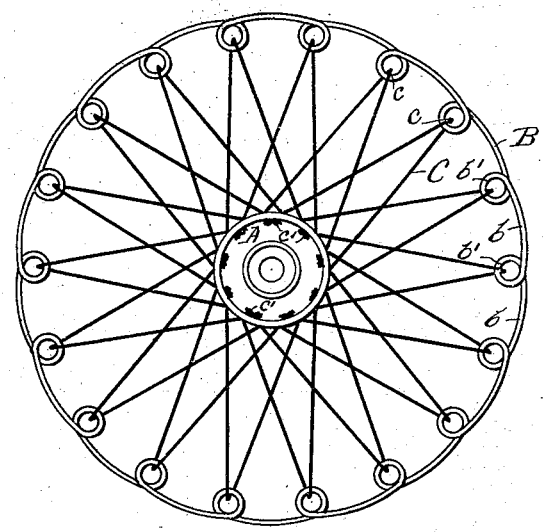
Nicholas Coleman
Inventor
Witnesses

UNITED STATES PATENT OFFICE.

NICHOLAS COLEMAN, OF READING, PENNSYLVANIA.

VEHICLE-WHEEL.

SPECIFICATION forming part of Letters Patent No. 648,391, dated May 1, 1900.

Application filed October 10, 1899. Serial No. 733,131. (No model.)

*To all whom it may concern:*

Be it known that I, NICHOLAS COLEMAN, a citizen of the United States of America, and a resident of Reading, in the county of Berks and State of Pennsylvania, have invented certain new and useful Improvements in Vehicle-Wheels, of which the following is a specification.

My invention relates to an improved construction of vehicle-wheel, the main object being to provide in a simple and inexpensive manner for such yield or elasticity at the rim as is required in service and which is now commonly provided for by the application of inflatable tires notwithstanding the well-known disadvantages incident to the use of these expensive and easily-punctured road-contacting devices.

My improved construction is fully described in connection with the accompanying drawing, and the novel features are specifically pointed out in the claims.

The drawing is a full elevation of a wheel embodying my invention.

The hub A may be of the ordinary type employed in bicycles and adapted for attachment of the usual wire spokes C.

My invention relates to the novel construction of the rim B, which is designed to dispense entirely with a separately-formed tire and at the same time to provide in itself a resiliency which is ordinarily provided only in a separately-formed tire carried by a rigid wheel-rim. In order to accomplish this, I form the rim B, as shown, of suitable wire or light tubing bent so as to form a series of arcs $b\ b$ of a length corresponding with the desired spacing of the spokes C and a corresponding series of interior loops $b'\ b'$, the latter being adapted for attachment of the spokes C and also allowing a yield or spring in each arc $b\ b$ as the weight is successively carried by them during the rotation of the wheel in service. Each arc is capable of yielding under the load as it comes upon it without appreciably increasing the spacing of the spoke connections $c\ c$, the loops adjacent to the arc bearing the load springing into slightly-different form as such arc is pressed toward the hub A, while at the same time there may be a slight movement of the spokes themselves, which, while inappreciable, will add materially to the resiliency of the rim without practically affecting the strength or life of the structure. The narrowness of the tread will allow of more ready avoidance of obstacles on the road-bed, and the rapidly-recurring spring movement of each arc as the load comes upon it will tend to prevent the adherence or objectionable accumulation of mud or the like upon the rim.

Any convenient means of attaching the spokes to the loops $b'$ may be employed, a nut $c'$ being preferably used in connection with each spoke to permit of varying the tension upon the spokes, as usual.

My improved rim may be applied to wheels of ordinary construction and may be renewed, if required, at comparatively-slight cost. All the annoyance and expense due to the punctures incident to the usual construction are of course entirely eliminated.

What I claim is—

1. A vehicle-wheel having a looped-wire rim and tension-spokes connecting the respective loops with the wheel-hub, substantially as set forth.

2. A rim for a vehicle-wheel formed of wire bent to form a series of internal spoke-attaching loops, substantially as set forth.

Signed by me at Reading, Pennsylvania, this 13th day of September, 1899.

NICHOLAS COLEMAN.

Witnesses:
W. G. STEWART,
WOOD M. SCHWARTZ, Jr.